United States Patent
Yao et al.

(10) Patent No.: US 6,673,492 B2
(45) Date of Patent: Jan. 6, 2004

(54) ELECTRODE MATERIAL FOR A SECONDARY CELL AND ITS PRODUCTION PROCESS

(75) Inventors: Shigeru Yao, Ichihara (JP); Shyusei Ohya, Ichihara (JP); Yukihiko Asano, Ichihara (JP); Toshikazu Hamamoto, Ube (JP); Kazuhiro Miyoshi, Ube (JP)

(73) Assignee: Ube Industries, Ltd. (JP)

( * ) Notice: Subject to any disclaimer, the term of this patent is extended or adjusted under 35 U.S.C. 154(b) by 156 days.

(21) Appl. No.: 09/861,729

(22) Filed: May 21, 2001

(65) Prior Publication Data

US 2002/0001752 A1 Jan. 3, 2002

(30) Foreign Application Priority Data

May 26, 2000 (JP) ........................ 2000-155525

(51) Int. Cl.[7] ........................ H01M 4/58; C01B 31/04
(52) U.S. Cl. ........................ 429/231.8; 423/448
(58) Field of Search ........................ 429/231.8, 231.4; 423/448

(56) References Cited

U.S. PATENT DOCUMENTS

| | | | |
|---|---|---|---|
| 5,626,981 A | * | 5/1997 | Simon et al. ........ 429/105 |
| 5,698,341 A | | 12/1997 | Tamaki et al. |
| 6,397,034 B1 | * | 5/2002 | Tarnawskyj et al. ........ 399/308 |
| 2001/0051300 A1 | * | 12/2001 | Moriguchi et al. ........ 429/231.8 |

FOREIGN PATENT DOCUMENTS

| | | |
|---|---|---|
| JP | 61-277165 | 12/1986 |
| JP | 63-058761 | 3/1988 |
| JP | 04-141953 | 5/1992 |
| JP | 04-161756 | 6/1992 |
| JP | 6-223821 * | 8/1994 |
| JP | 07-296814 | 11/1995 |
| JP | 11-097012 | 4/1999 |

* cited by examiner

Primary Examiner—Randy Gulakowski
Assistant Examiner—Jonathan Crepean
(74) Attorney, Agent, or Firm—Piper Rudnick LLP

(57) ABSTRACT

An electrode material for a secondary cell comprising as its essential component a powder of graphite having a crystallinity of 90% or more obtained by graphitizing a highly heat resistant polymer compact in an anaerobic atmosphere and crushing into a powder, and a process for the production of an electrode material for a secondary cell comprising heating and graphitizing a composition in which 0–10 wt % of a boron compound is added to a highly heat-resistant polymer to produce a powder of graphite having crystallinity of 90% or more contained as its essential component. An electrode material for a secondary cell having excellent charge/discharge cycle life and discharge voltage performance is provided.

7 Claims, 1 Drawing Sheet

ELECTRODE MATERIAL FOR A SECONDARY CELL AND ITS PRODUCTION PROCESS

BACKGROUND OF THE INVENTION

1. Field of the Invention

The present invention relates to an electrode material for a secondary cell obtained by graphitization of a highly heat resistant polymer and having excellent cell performance, and to its production process.

2. Description of the Related Art

The popularity of personal computers, cellular telephones and similar devices is expected to continue to grow in the future accompanying the increasing utilization of information in society and, accompanying this growing popularity, secondary cells used as power sources for portable devices are being required to provide higher energy density and larger capacity. Lithium secondary cells, in particular, which use a non-aqueous electrolyte, have high cell voltage and high energy density.

Examples of secondary cells known in the prior art include button cells like that are described in Japanese Unexamined Patent Publication No. 63-58761, and coil cells like those described in Japanese Unexamined Patent Publication No. 4-161756. These cells are composed by coating and forming the positive and negative electrode materials on charge collectors comprising metal plates, installing a separator between both electrode plates, and immersing the assembly in an electrolyte.

In the cells of the prior art, graphite or amorphous carbon-based carbon black was used for the electrode conductor. However, these materials have the problem of the output density being too low. Cells having a high output density are required as the power sources for personal computers, cellular telephones, portable video equipment, electric automobiles and so forth. In addition, since a large amount of current is consumed when starting these devices, cell performance is required to withstand rapid discharge. In addition, in the case of large cells as well, an extremely large output is required when an electric automobile, for examples, starts, and a satisfactory rapid discharge performance is required. In the case of using graphite or amorphous carbon for the electrode, adequate discharge characteristics are not obtained. For example, discharge capacity decreases by about 20–30% when the discharge rate is raised from 0.325 C. (4 hour rate) to 2 C. (30 minute rate). In this manner, when the discharge rate is increased, cycle characteristics decrease correspondingly, thereby limiting the cell life. Among those factors that affect discharge characteristics, electron conductivity within the positive electrode is considered to be the dominant factor. Although the amount of graphite or amorphous carbon serving as the conductor could be increased in order to improve electron conductivity within the electrode, in this case, since the proportion of conductor that occupies the electrode increases, volume energy density, which is an important cell characteristic, ends up decreasing. Namely, improving electron conductivity within the electrode while maintaining a high volume energy density is important in terms of developing a practical cell.

With respect to lithium secondary cells, lithium metal, lightly graphitized carbon particles and highly graphitized carbon particles are used as negative electrode materials. In addition, there has also been active development of a low-temperature carbonized carbon negative electrode material in recent years.

Although lithium metal is able to realize a high charge/discharge capacity, due to its high reactivity, the capacity decreases as a result of reacting with solvent present in the electrolyte as the charge/discharge cycle progresses. In addition, since branched-form lithium metal forms easily, there is the problem of this branched-form lithium metal passing through the separator provided between the positive and negative electrodes causing a short-circuit. Although lightly graphitized carbon materials are characterized by having low reactivity with an electrolyte and being resistant to the formation of branched-form lithium metal, the charge/discharge capacity is typically low and, due to the low true density, it has the disadvantage of a low charge/discharge capacity per unit volume, thereby being unable to attain the realization of a secondary cell having high energy density.

In addition, although examples of low-temperature carbonized carbon negative electrode materials exhibiting remarkably high discharge capacities have been reported, these have significant practical problems including low initial charge/discharge efficiency, small charge/discharge capacity per unit volume due to the low specific gravity, high discharge potential, large hysteresis accompanying charging and discharging, and significant cycle deterioration.

On the other hand, highly graphitized carbon particles used for the negative electrode have a higher charge/discharge capacity in comparison with lightly graphitized carbon particles. Since they are also characterized by lower reactivity with an electrolyte and greater resistance to formation of branched-form lithium metal as compared with lithium metal, they have been studied actively in recent years for use as negative electrode materials, and expectations are being placed, in particular, on their use in the development of an electrode for secondary cells having excellent performance.

Lithium ions present in the compound between the graphite layers (negative electrode) are released from between carbon layers during discharge and return to the positive electrode. An interlayer compound is formed with lithium by using graphite for the negative electrode and charging electrochemically. It has been theoretically determined that the maximum capacity is achieved when in the state in which a single lithium atom is coordinated with respect to six carbon atoms (C6Li), and the discharge capacity of the negative electrode can be increased up to a maximum of 372 mAh/g-carbon.

In the case of highly graphitized carbon particles, since small, isotropic crystallites of the graphite structural crystals result in the end faces of the graphite crystals being exposed on the surface, it becomes easier for metal ions to coordinate, thereby making this preferable. In addition, since the higher the density of the graphite particles the greater the energy density, weight is reduced and charge/discharge capacity is increased. Consequently, coiled cells, for example, are typically produced by blending the graphite particle powder with a binder to form a paste, adhering this paste to a charge collector sheet, rolling and then coiling with the positive electrode and separator to form the cell.

The role of the binder here is to form the active substance into a paste, bind the active substance together, adhere the active substance to the charge collector sheet and contribute to the safety of the cell overall.

As an example of a secondary cell electrode, a secondary cell electrode is disclosed in Japanese Patent No. 2874999 which is obtained by bringing an alkali metal into electrical contact with a support composed of a mixture of a carbonaceous material, having a hydrogen/carbon atomic ratio of less than 0.315, a spacing distance d002 between surfaces (002) as determined by x-ray wide angle diffraction of 3.37 angstroms or more, and a crystallite size in the direction of the c axis (Lc) of 220 angstroms or less, and a polymer composition having alkali metal ion conductivity to cause the alkali metal loaded on the support as an active substance.

In addition, an electrode carbonaceous material for a secondary cell is disclosed in Japanese Patent No. 2856795 in which the hydrogen/carbon atomic ratio (H/C) is less than 0.315, the spacing distance between surfaces (002) as determined by X-ray wide angle diffraction is 3.39–3.75 angstroms, and the crystallite size (Lc) in the direction of the c axis is 5–150 angstroms.

In addition, a graphite material for a non-aqueous electrolyte secondary cell electrode is disclosed in Japanese Patent No. 2948097 in which the mean interlayer spacing distance d(002) between surfaces (002) as determined by X-ray diffraction is 0.3336–0.3350 nm, the crystallite size Lc(002) in the direction of the c axis is greater than 15 nm up to 50 nm, and the crystallite size La(110) in the direction of the a axis is 5–50 nm, wherein, a fine, optically anisotropic mosaic structure is confirmed by observation of polarizing micrographs at 1000×, and the actual dimension of the long axis reference of the anisotropic (mosaic) units that compose said optically anisotropic structure is 10 μm or less.

However, since the cell performance of these known secondary cell electrodes of the prior art is still inadequate, there continues to be a need for a secondary cell electrode capable of attaining a high level of cell performance.

BRIEF SUMMARY OF THE INVENTION

The object of the present invention is to provide an electrode material for a secondary cell having excellent performance with respect to charge/discharge cycle life and discharge voltage, and its production process.

In order to attain the above object of the present invention, the present invention provides an electrode material for a secondary cell comprising as its essential component a powder of graphite having crystallinity of 90% or more obtained by graphitizing a highly heat resistant polymer in an anaerobic atmosphere.

In addition, the present invention provides a process for the production of an electrode material for a secondary cell comprising heating and graphitizing a graphite precursor in which 0–10 wt % of a boron compound has been added to a highly heat resistant polymer to cause a powder of graphite, having a crystallinity of 90% or more, to be contained as its essential component.

DETAILED DESCRIPTION OF THE INVENTION

Figure 1:
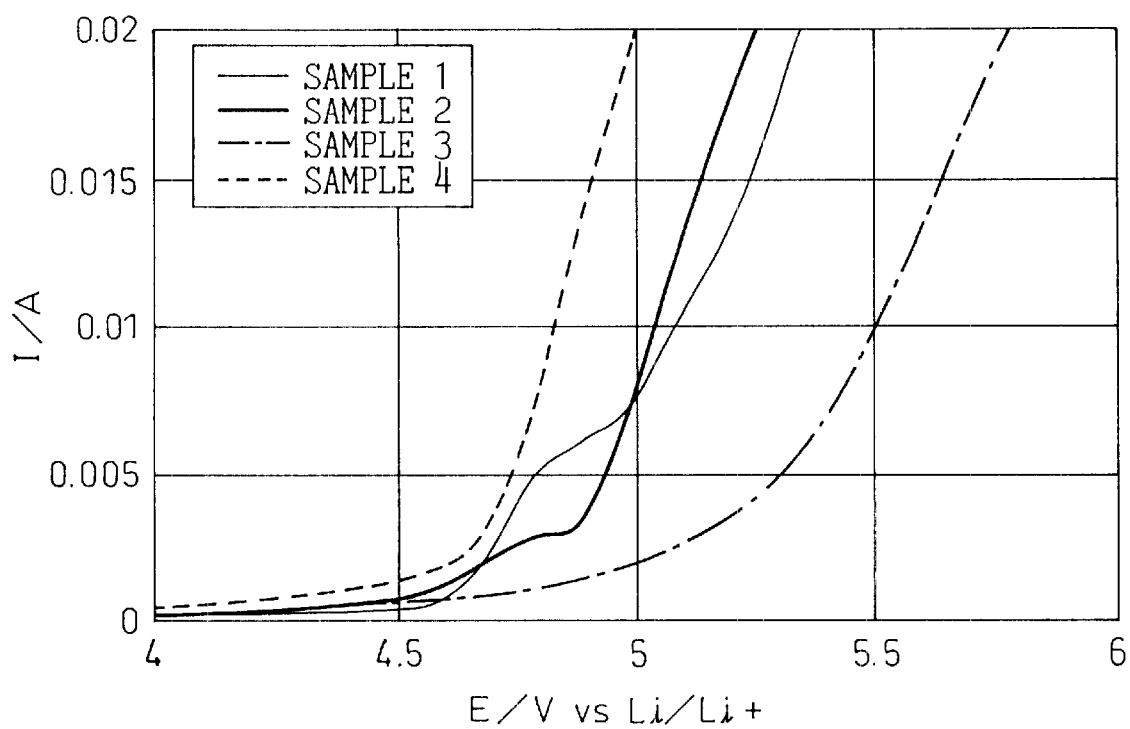
FIG. 1 is a graph showing the measurement results of the oxidative decomposition behavior of electrolyte in a three-electrode glass cell of an example obtained by using electrode materials according to the present invention (sample nos. 1–3) and a standard graphite electrode material of the prior art (sample no. 4).

The following embodiments are preferable for the above electrode material for a secondary cell.

(1) The graphite has a graphite structure in which the crystallite size as determined by X-ray diffraction is 100–500 angstroms.

(2) The graphite has a graphite structure in which the spacing distance [d(002)] between surfaces (002) as determined by X-ray diffraction is 3.34–3.40 angstroms.

(3) The highly heat-resistant polymer is a polyimide that yields a polyimide film having high rigidity (and preferably a tensile modulus of elasticity of 500 kgf/mm$^2$ or more).

(4) Graphite powder is contained, as an essential component, and has a crystallinity of 90% or more and is obtained by heating and graphitizing a graphite precursor in which 0–10 wt % of a boron compound has been added to the highly heat-resistant polymer.

Preferable examples of the highly heat-resistant polymer in the present invention may include polyimides having a high molecular weight and high heat resistance, and more particularly, high-molecular-weight aromatic polyimides obtained by condensation polymerization and heating an aromatic acid component and aromatic diamine.

The following mainly provides an explanation of the case in which the highly heat resistance polymer is aromatic polyimide.

A polyimide that is a typical example of a highly heat resistant polymer used in the present invention can be produced by a known method such as the method indicated below.

A polyimide is produced by thermal imidation or chemical imidation of a polyimide precursor. The form of polyimide may be a powder or film.

In the present invention, the term "polyimide precursor" refers to a polyamic acid obtained by polymerizing monomers of a tetracarboxylic acid component and an aromatic diamine component, preferably those belonging to an aromatic compound, or its partially imidated product, which can be made into a polyimide resin through ring closure by heat or chemical treatment. The term "polyimide resin" refers to, as described hereinafter, a heat-resistant polymer having an imidation rate of about 50% or more, preferably 75% or more, and particularly preferably 90% or more.

Examples of organic solvents used as the solvent of the above polyimide precursor solution include parachlorophenol, N-methyl-2-pyrrolidone (NMP), pyridine, N,N-dimethylacetamide, N,N-dimethylformamide, dimethylsulfoxide, tetramethyl urea, phenol and cresol.

A polyimide precursor having an inherent viscosity (30° C., concentration: 0.35 g/100 ml NMP) of 0.33 or more and particularly 0.35–7 is produced by dissolving and polymerizing roughly equimolar amounts of a tetracarboxylic acid component and an aromatic diamine component in the above organic solvent. In addition, a partially imidated polyimide precursor is produced through partial ring closure when polymerization is carried out at a temperature of about 80° C. or higher.

Preferable examples of aromatic diamines include an aromatic diamine compound represented with the following formula:

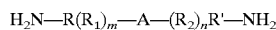

$H_2N-R(R_1)_m-A-(R_2)_nR'-NH_2$ (wherein, R and R' each independently represent a direct bond or a divalent aromatic group, $R_1$ and $R_2$ each independently represent a hydrogen atom or a substituent such as a lower alkyl group or a lower alkoxy group, A represents a direct bond or a divalent group such as O, S, CO, $SO_2$, SO, $CH_2$ or $C(CH_3)_2$, m and n are independently 0 or an integer of 1–4, and the sum of m and n is an integer of 1–4).

Specific examples of the above aromatic diamine compounds include 1,4-diaminobenzene, [4,4'- diaminophenylether-]4,4'-diaminodiphenylether (which may be abbreviated as DADE), 3,3'-dimethyl-4,4'-diaminodiphenylether and 3,3'-diethoxy-4,4'-diaminodiphenylehter.

In the present invention, diaminopyridine may be used for the diamine component in place of the above aromatic diamines, specific examples of which include 2,6-diaminopyridine, 3,6-diaminopyridine, 2,5-diaminopyridine and 3,4-diaminopyridine.

Two or more of the above compounds may be used in combination for the diamine component. Among these, 1,4-diaminobenzene or a mixture in which it is contained may be used most preferably.

Although preferable examples of the tetracarboxylic acid component are 3,3',4,4'-biphenyltetracarboxylic dianhydride (which may be abbreviated as s-BPDA) and 2,3,3',4'-biphenyltetracarboxylic dianhydride (which may be abbreviated as a-BPDA), they may also be salts of 2,3,3',4'- or 3,3',4,4'-biphenyltetracarboxylic acid or of 2,3,3',4'- or 3,3', 4,4'-biphenyltetracarboxylic acid, or their esterified derivatives. The tetracarboxylic acid component may also be a mixture of the above biphenyltetracarboxylic acids.

In addition, besides the biphenyltetracarboxylic acids mentioned above, the above biphenyltetracarboxylic acid component may be substituted at the ratio of 50 mol % or less, preferably 10 mol % or less, and particularly 5 mol % or less, relative to the total amount of tetracarboxylic acid component, with a tetracarboxylic acid such as pyromellitic acid, 3,3',4,4'-benzophenonetetra-carboxylic acid, 2,2-bis(3, 4-dicarboxyphenyl)propane, bis(3,4-dicarboxyphenyl) sulfone, bis(3,4-dicarboxyphenyl)ether, bis(3,4-dicarboxyphenyl)thioether, butanetetra-carboxylic acid or an acid anhydride, salt or esterified derivative thereof. In addition, the tetracarboxylic acid component may also be a mixture of the above tetracarboxylic acids.

Among these tetracarboxylic acids, 3,3',4,4'-biphenyltetracarboxylic dianhydride or a mixture in which it is contained may be used most preferably.

The above polyimide precursor may be prepared into a polyimide precursor solution by dissolving at a ratio of 0.33–60 wt %, and preferably 1–30 wt %, in the above organic solvent (or a polymerization solution may be used directly). If the ratio of polyimide precursor is less than 0.33 wt %, film strength may decrease when producing a film, thereby making this unsuitable. If the ratio of polyimide precursor exceeds 60 wt %, it may become difficult to obtain a uniform solution. Consequently, a ratio within the above range is preferable. In addition, the solution viscosity of the prepared polyimide precursor solution may preferably be 10–10000 poise, and more preferably 40–3000 poise. If the solution viscosity is less than 10 poise, film strength may decrease when producing a polyimide precursor film, thereby making this unsuitable. If the solution viscosity exceeds 10000 poise, it may become difficult to cast into a film. Consequently, a solution viscosity within the above range is preferable.

Although there are no particular restrictions on the method for obtaining a cast film of the polyimide precursor solution, a technique can be used such as a method in which a film is obtained by casting the polyimide precursor solution onto a substrate made of glass and so forth or a moving belt to serve as a base, or extruding the polyimide precursor solution from a T die.

The polyimide precursor film is then subjected to heat treatment or chemical treatment. Heat treatment of the polyimide precursor film may be carried out for 5–60 minutes at 280–500° C. in air while anchoring the polyimide precursor film using pins, chucks or pinch rolls and so forth to prevent the occurrence of thermal contraction.

Chemical treatment of the polyimide precursor film is carried out using an aliphatic acid anhydride or aromatic acid anhydride as a dehydrating agent, and using a tertiary amine such as triethylamine as a catalyst. In addition, imidazole, benzimidazole and their substituted derivatives may also be used as described in Japanese Unexamined Patent Publication No. 4-339835.

The imidation rate of the heat-treated or chemical-treated polyimide film may be about 50% or more, preferably about 75% or more, and particularly 90% or more. If the imidation rate is less than about 50%, a large amount of moisture may be produced by dehydration during additional heat treatment and carbonization of the polyimide film, thereby resulting in greater contraction due to heat treatment and making this unsuitable.

A polyimide film can be produced using the above production method. A carbonized film can be obtained by carrying out heat treatment on this film at a maximum temperature of 1000–1500° C. in an anaerobic atmosphere.

The term "anaerobic atmosphere" refers to that which is required to be free of a gas having oxidative activity such as oxygen. Argon, helium, nitrogen and so forth are suitable for use as the anaerobic gas. An argon atmosphere is particularly preferable. When carbonizing the precursor, it is preferable to carry out carbonization in an anaerobic atmosphere gas flow so as to smoothly remove the decomposition products and prevent the decomposition products once evaporated from being re-deposited.

In addition, it is preferable that the polyimide film or powder be carbonized gradually. If the decomposition products are removed rapidly, the carbon component may end up being removed resulting in a lower carbonization yield, thereby making this undesirable. This may also result in greater susceptibility to structural defects in the case of a film. Consequently, it is preferable to heat the polyimide film sufficiently slowly at a heating rate of 15° C. or less/minute, and particularly 1–10° C./minute.

It is also preferable to carry out carbonization treatment while applying tension perpendicular to the film surface during heating. As a result, contraction during carbonization is reduced, and since the precursor is able to orient more easily during carbonization, a graphite precursor can be obtained that results in a graphite structure having a high degree of crystallinity suitable for use as an electrode material.

An example of a preferable method for applying tension perpendicular to the film surface involves holding the film between heat-resistant sheets, porous plates or films while heating. This is preferable because, for example, the film can be prevented from warping and the orientation of carbon in the film can be maintained during carbonization.

Graphite having a high crystallinity can be produced by carrying out heat treatment at a temperature of 2600–3500° C. in an anaerobic atmosphere on a carbonized film of a graphite precursor obtained in the above manner.

In particular, in order to obtain a graphitized film for use as an electrode material for a secondary cell of the present invention, treatment is preferably carried out while applying pressure simultaneous to heating, and heating with an isotactic press is particularly preferable.

In the present invention, it is necessary that the crystallinity of the graphite be 90% or more. In the case that the crystallinity of the graphite is lower than 90%, the charge/discharge capacity becomes too low, thereby preventing this from being suitable for use in the electrode of a secondary cell.

Consequently, it is preferable to add a boron compound prior to graphitization and heat to a high temperature in an isotropic atmosphere since this allows the obtaining of a graphite film having high crystallinity. The boron compound may be added to the polyimide precursor solution when forming the polyimide film or powder. As a result of adding a boron compound, the crystallinity of a product is 90% or more, that is suitable for an electrode. This is thought to be because boron forms a solid solution with graphene layer, and eliminates the strain in the graphene by dispersing and moving within said mesh surface. In particular, since boron carbide has a melting point near 2450° C., which is the temperature region at which graphite crystals begin to exhibit prominent growth, and it does not contain elements other than carbon or boron in its composition, it can be used preferably due to its considerable effect of promoting graphite crystal growth. Examples of the boron compound include boron or oxides, hydroxides and carbides of boron.

With respect to the method of adding the boron compound, the boron compound may be added as a solid or solution to a film or powder of the heat-resistant polymer. It may also be coated onto a film or powder surface by a coating method. In the case of adding by a coating method, for example, a boron compound such as a salt or carbide may be dissolved in a suitable solvent, e.g., boric acid may be dissolved in ethanol, to form a liquid and the liquid may then be coated. The boron compound may also be added to the polyimide precursor solution. Boron metal can also be vapor deposited. The amount of the boron compound added is preferably 0–10 wt %, more preferably 0.01–7 wt %.

The structure of a graphite material obtained in this manner is preferably such that the spacing distance d(200) of the (002) surfaces as determined by X-ray diffraction is 3.34–3.40 angstroms, and more preferably 3.34–3.39 angstroms. If d(200) deviates from this range, the flatness of the discharge curve may become poor, thereby making this undesirable.

The content of the nitrogen atom in the graphite material is preferably 0.1–3 at %, and the content of the boron atom in the graphite material is preferably 0.01–5 at %.

The crystallite size Lc(002) in the direction of the C axis is preferably 100–500 angstroms, and particularly preferably 150–400 angstroms. If the Lc(002) exceeds 500 angstroms, the crystallites may have fewer edges causing charging or discharging to become slow, thereby making this undesirable. If the Lc(002) is less than 100 angstroms, there may be few lithium ions that are able to coordinate. Therefore, it is preferable that the Lc(002) be within this range.

Graphite density is preferably large, and the density is preferably 1.85 g/cm$^3$ or more within a range that satisfies the above structural characteristics.

In the case of using a film for the precursor, graphite powder is prepared by grinding the resulting graphite film, and in the case of using a powder for the precursor, the powder can be used as is to obtain an electrode material for a secondary cell. There are no particular restrictions on the grinding means, examples of which include a ball mill, tube mill, impact pulberizer, atomizer, hammer mill, while preferable examples include a ball mill, hammer mill, disintegrator and blasting machine. A preferable grinding means is one which does not subject the graphite crystals to excessively powerful friction in order to prevent the crystals from becoming amorphous due to friction.

The electrode of a secondary cell can be formed by kneading graphite powder and fluororesin binder by means of a solvent to form a paste, applying the paste to a metal charge collector and drying.

Although the following examples provides a detailed explanation of the present invention, the present invention is not limited by these examples.

EXAMPLE 1

Production of Polyimide Film s-BPDA as a tetracarboxylic acid component and 1,4-diaminobenzene (paraphenylenediamine) as a diamine component were dissolved in N-methyl-pyrrolidone (NMP) so that the molar ratio of the diamine to s-BPDA was 0.996 and the total weight of said monomer components was 18 wt %. Polymerization was then carried out at a temperature of 40° C. for 10 hours to obtain a polyimide precursor solution. The viscosity of the polyimide precursor solution was 1500 poise.

The resulting polyimide precursor solution was cast onto a glass plate to a thickness of about 120 μm followed by carrying out heat treatment in air at a temperature of 400° C. for 10 minutes to obtain a highly rigid (tensile modulus of elasticity of about 900 kgf/mm$^2$) polyimide film having a thickness of 30 μm.

Production of Graphite Powder

A laminate comprised of 20 sheets of the polyimide film obtained above was sandwiched on both sides between porous carbon sheets in an argon gas atmosphere followed by heating from 20° C. to 1000° C. at a rate of 10° C./minute. Moreover, the temperature was additionally raised to 3000° C. at a rate of 5° C./minute with an isotropic press after which the temperature was held at 3000° C. for 60 minutes. After cooling, the resulting carbonized film exhibited luster, flexibility and toughness. The density was 1825 kg/M$^3$. The graphite crystallinity, as determined by the Ruland method of X-ray measurement, was 98%. Lc(002) was 200 angstroms and spacing distance d(002) was 3.345 angstroms.

This graphite film was ground with a mortar and additionally ground for 10 minutes with a ball mill to obtain graphite powder.

Production of Cell Electrode

The graphite powder (electrode active material) obtained above was mixed with polyvinylidene fluoride (binder) at a ratio of 90 wt % to 10 wt % followed by the addition of N-methylpyrrolidone solvent. The resulting mixture was coated onto copper foil, dried, press molded and heat-treated to obtain an electrode. Moreover, lithium metal was pressed onto stainless steel mesh to obtain the other electrode. A cell for charge/discharge test (diameter: 20 mm, thickness: 32 mm) was then produced composed of these materials using 1 M LiPF$_6$-EC/DMC (1/2 volume ratio) for an electrolyte and a porous polypropylene film for a separator. This cell was then used in a charge/discharge test. A cycled charge/discharge test was conducted using as charging and discharging conditions an upper limit voltage of 1.0 V, lower limit voltage of 0.001 V and current density of 0.4 mA/cm$^2$. The results of evaluation are shown below.

Evaluation Results
Initial electric capacity: 280.1 mAh/g

| Cycle characteristics | Graphite electrode capacity |
| --- | --- |
| 2nd discharge | 276.5 mAh/g |
| 3rd discharge | 272.6 mAh/g |

| Evaluation Results Initial electric capacity: 280.1 mAh/g ||
|---|---|
| Cycle characteristics | Graphite electrode capacity |
| 4th discharge | 270.0 mAh/g |
| 5th discharge | 268.5 mAh/g |
| 6th discharge | 266.9 mAh/g |
| 7th discharge | 265.9 mAh/g |
| 8th discharge | 264.0 mAh/g |
| 9th discharge | 262.3 mAh/g |
| 10th discharge | 260.0 mAh/g |
| 15th discharge | 251.1 mAh/g |
| 20th discharge | 242.5 mAh/g |
| 25th discharge | 234.0 mAh/g |
| 30th discharge | 224.6 mAh/g |

EXAMPLE 2

Production of Polyimide Film s-BPDA as a tetracarboxylic acid component and 1,4-diaminobenzene (paraphenylenediamine) as a diamine component were dissolved in N-methyl-pyrrolidone (NMP) so that the molar ratio of the diamine to s-BPDA was 0.996 and the total weight of said monomer components was 18 wt %. Polymerization was then carried out at a temperature of 40° C. for 10 hours to obtain a polyimide precursor. The viscosity of the polyimide precursor solution was 1500 poise. Boron carbide powder having a particle size of 20 μm or less was weighed out so that the weight ratio with polyamic acid is 5% and added to this solution followed by stirring until it was uniformly dispersed. The resulting boron carbide-dispersed polyimide precursor solution was then cast onto a glass plate to a thickness of about 120 μm followed by carrying out heat treatment in air at a temperature of 400° C. for 10 minutes to obtain a highly rigid polyimide film having a thickness of 30 μm in which boron carbide was dispersed.

Production of Graphite Powder

A laminate comprised of 20 sheets of the polyimide film obtained above was sandwiched on both sides between porous carbon sheets in an argon gas atmosphere followed by heating from 20° C. to 1000° C. at a rate of 10° C./minute. Moreover, the temperature was additionally raised to 3000° C. at a rate of 5° C./minute with an isotactic press after which the temperature was held at 3000° C. for 60 minutes. After cooling, the resulting carbonized film exhibited luster, flexibility and toughness. The density was 1905 kg/m³. The graphite crystallinity, as determined by the Ruland method of X-ray measurement, was 98% or more. Lc(002) was 380 angstroms and spacing distance d(002) was 3.34 angstroms.

This graphite film was ground with a mortar and additionally ground for 10 minutes with a ball mill to obtain graphite powder.

Production of Cell Electrode

With the exception of using the graphite powder (electrode active material) obtained above, electrodes were produced in the same manner as in Example 1. A cell for charge/discharge test (diameter: 20 mm, thickness: 32 mm) was produced composed of those materials using a porous polypropylene film for a separator in the same manner as in Example 1 followed by charge/discharge testing in the same manner as in Example 1. The results of evaluation are shown below.

| Evaluation Results Initial electric capacity: 326.1 mAh/g ||
|---|---|
| Cycle characteristics | Graphite electrode capacity |
| 2nd discharge | 325.3 mAh/g |
| 3rd discharge | 323.4 mAh/g |
| 4th discharge | 322.5 mAh/g |
| 5th discharge | 322.5 mAh/g |
| 6th discharge | 321.3 mAh/g |
| 7th discharge | 320.8 mAh/g |
| 8th discharge | 319.3 mAh/g |
| 9th discharge | 316.2 mAh/g |
| 10th discharge | 313.2 mAh/g |
| 15th discharge | 305.3 mAh/g |
| 20th discharge | 300.7 mAh/g |
| 25th discharge | 295.5 mAh/g |
| 30th discharge | 291.0 mAh/g |

Comparative Example 1

With the exception of using 4,4'-diaminodiphenylether (DADE) for the diamine component, a polyimide film was produced in the same manner as in Example 1, and a carbonized film was produced by baking at 1200° C. Graphite crystallinity was 12%. Lc(002) as determined by x-ray diffraction was 16 angstroms, and spacing distance d(002) was 3.56 angstroms. A coin cell was then produced in the same manner as in Example 1. The results of evaluation are shown below.

| Evaluation Results Initial electric capacity: 143.3 mAh/g ||
|---|---|
| Cycle characteristics | Graphite electrode capacity |
| 2nd discharge | 144.2 mAh/g |
| 5th discharge | 116.3 mAh/g |
| 10th discharge | 89.8 mAh/g |
| 20th discharge | 43.8 mAh/g |
| 30th discharge | 20.5 mAh/g |

Comparative Example 2

With the exception of using typical commercially available mesophase microbeads (MCMB) (produced by Osaka Gas Co.) for the electrode, cell performance was measured in the same manner as in Example 1. The results of evaluation are shown below.

| Evaluation Results Initial electric capacity: 234.87 mAh/g ||
|---|---|
| Cycle characteristics | Graphite electrode capacity |
| 2nd discharge | 234.5 mAh/g |
| 5th discharge | 215.5 mAh/g |
| 10th discharge | 197.8 mAh/g |
| 20th discharge | 175.0 mAh/g |
| 30th discharge | 155.4 mAh/g |
| 50th discharge | 140.0 mAh/g |

EXAMPLE 3

Production of Polyimide Film

Symmetrical biphenyltetracarboxylic dianhydride (s-BPDA) as a tetracarboxylic acid component and paraphenylenediamine (PDA) as a diamine component were dissolved in N,N-dimethylacetamide so that the molar ratio of the diamine to s-BPDA was 0.994 and the total weight of said monomer components was 18 wt %. Polymerization was then carried out at a temperature of 40° C. for 10 hours to obtain a polyimide precursor solution.

The resulting polyimide precursor solution was cast onto a mirrored stainless steel substrate to a thickness of about 100–180 μm followed by carrying out heat treatment in air at a temperature of from 80° C. to 180° C. to form a gel. The gelled film was then immobilized by reapplying to a pin tenter and then heat-treated in air at a temperature of from 120° C. to 450° C. to produce a film having different film thicknesses and molecular surface orientation.

Production of Carbide Film

The polyimide film obtained above was cut to a size of about several centimeters with a cutter and so forth, and pieces of polyimide film were placed in an alumina crucible and allowed to stand in an electric furnace. The temperature of the electric furnace was then raised from 20° C. to 1400° C. at a rate of 10° C./minute in a nitrogen gas flow, after which the temperature was held at 1400° C. for 120 minutes. The resulting carbonized pieces exhibited luster and were brittle. According to the results obtained by X-ray diffraction, the carbonized pieces exhibited only a slight crystalline phase, and crystallinity, as determined according to the Ruland method, was 10–40%.

Mixing and Grinding of Boron Carbide Powder

Boron carbide ($B_4C$) powder having a particle size of 5 microns or less was added to the carbonized pieces obtained above so that the weight ratio was 2 wt %, and then charged into a pot for use with a vibrating ball mill. A suitable amount of pure water was added to the pot followed by mixing and grinding with a wet vibrating ball mill. The resulting slurry was then centrifuged and dried to obtain a mixed powder of carbide and boron carbide.

Production of Carbonized Material of Solution-Precipitating Polyimide Powder

Symmetrical biphenyltetracarboxylic dianhydride (s-BPDA) as an acid dianhydride and paraphenylenediamine (PDA) as a diamine component were dissolved in N,N-dimethylacetoamide so that the molar ratio of diamine to s-BPDA was 0.994 and the total weight of said monomer components was 18 wt %. Polymerization was then carried out at a temperature of 40° C. for 10 hours to obtain a polyimide precursor solution. The polyamic acid in the solution was then thermally imidated by stirring the solution at a temperature of 200–300° C., and insoluble polyimide was precipitated as a powder in the solution. The resulting polyimide powder was then adequately separated, washed and dried.

These particles were placed in an alumina crucible and then allowed to stand in an electric furnace. The temperature of the electric furnace was then raised from 20° C. to 1400° C. at a rate of 10° C./minute in a nitrogen gas flow, after which the temperature was held at 1400° C. for 120 minutes to obtain carbon powder. According to the results obtained by x-ray diffraction, the carbon particles exhibited only a slight crystalline phase, and crystallinity, as determined according to the Ruland method, was 7–30%.

Production of Graphite Powder

Graphitization heat treatment was performed on the previously obtained mixed powder of the carbonized material and boron carbide as well as the carbon powder obtained above with a hot isotropic press (HIP). The sample powder was charged into a covered carbon crucible which was then placed in the HIP chamber. The temperature was raised at a rate of 10–20° C./minute while pressurizing with argon gas, and the temperature was held at 2800° C. for 1.5 hours at 2000 atm. The furnace was then cooled while gradually lowering the pressure. The resulting powder exhibited a grayish-black color.

Characterization of Graphite Powder

The resulting graphite powder was evaluated by X-ray diffraction and scanning electron microscope (SEM) observation. In addition, the specific surface area of the graphite powder was evaluated by the mercury pressing method. Crystallinity demonstrated a value of 90% or more in all cases in reflection of having used an easily graphitized materials in the form of s-BPDA/PDA polyimide for the precursor.

Measurement of Oxidative Decomposition Behavior in Electrolyte

An electrode was produced using 10 mg of the graphite powder obtained above and 10 wt % polyfluorovinylidene (PVDF) as binder. A three-electrode glass cell was prepared by using the above electrode for the test electrode, and lithium metal for the counter electrode and reference electrode. The oxidation potential was then measured in 1 M $LiPF_6$/polycarbonate (PC) electrolyte to investigate the oxidative decomposition behavior around the test electrode in the electrolyte. Measurement was performed under conditions of 10 mV/second and rest potential (approx. 3 V) to 6 V.

Table 1 shows the production conditions and properties of the carbon powder originating in polyimide, and the evaluated oxidation potential. The current value, which increases as the potential becomes higher, can be interpreted as being indicative of the oxidative decomposition behavior of the electrolyte. The oxidation potential was evaluated using a threshold value of 5 mA to serve as a general reference, and comparisons were made between each sample. All of the polyimide baked products exhibited a higher electrolyte oxidation potential as compared with an ordinary carbon conductive material in the form of KS6 (Timcal Ltd. (formerly known as Lonza)).

TABLE 1

| Sample No. | 1 | 2 | 3 | 4* |
|---|---|---|---|---|
| Polyimide precursor form | Film | | Powder | — |
| Polyimide film thickness (μm) | 75 | 125 | — | — |
| C axis lattice constant (Å) | 6.776 | 6.756 | 6.840 | 6.720 |
| Crystallinity (%) | 94 | 95 | 90 | 93.5 |
| Nitrogen atom content* (at %) | 0.82 | 0.10 | 0.66 | <0.10 |
| Boron atom content* (at %) | 0.9 | 0.75 | 0.60 | ≦0.2 |
| Specific surface area (m²/g) | 8.58 | 9.37 | 7.94 | 19.1 |
| Oxidation potential* (V) | 4.79 | 4.94 | 5.31 | 4.75 |

*Sample No. 4 is a standard graphite conductive material (trade name: KS6 (Timcal Ltd. (formerly known as Lonza)).
*Oxidation potential was evaluated as the potential when using a threshold current of 5 mA.
*Atomic nitrogen and boron contents (at %) were determined by ESCA after crushing the graphite powder.

FIG. 1 shows the measurement results for oxidative decomposition behavior. As can be seen from this graph, in the case of samples 1, 2 and 3, and particularly samples 1 and 2, the base current value in the measuring range of 4–4.5 V can be seen to be lower than sample 4. In addition to this being due to the difference in specific surface area, this is also thought to be due to effects resulting from differences in activity caused by differences in surface structure. This is an advantageous characteristic from the perspective of oxidative decomposition of the electrolyte, since it can be expected to inhibit deterioration of electrolyte in the range of practical use.

The present invention is able to provide an electrode material for a secondary cell having excellent cell performance by graphitizing heat-resistant polymer in an anaerobic atmosphere to obtain a graphitized film followed by forming that film into a powder.

We claim:

1. A process for the production of an electrode material for a secondary cell comprising: heating and graphitizing a polyimide film or powder, obtained by polymerization of a biphenyltetracarboxylic acid component and 1,4-diaminobenzene or a mixture of 1,4-diaminobenzene and 4,4-diamino diphenylether, in which 0.01–10 wt % of a boron compound is added to the polyimide to cause a powder of graphite having crystallinity of 90% or more contained as its essential component.

2. The process according to claim 1, wherein the crystalline size of the graphite as determined by x-ray diffraction is 100–500 angstroms.

3. The process according to claim 1, wherein the spacing distance between surfaces (002) of the graphite as determined by x-ray diffraction is 3.300–3.400 angstroms.

4. The process according to claim 1, wherein the polyimide yields a highly rigid polyimide film.

5. The process according to claim 1, wherein a content of nitrogen atom in the graphite material is 0.01–5 at %.

6. The process according to claim 1, wherein a content of boron atom in the graphite material is 0.01–5 at %.

7. An electrode material obtained by the process according to claim 1.

* * * * *

UNITED STATES PATENT AND TRADEMARK OFFICE
CERTIFICATE OF CORRECTION

PATENT NO. : 6,673,492 B2  Page 1 of 1
DATED : January 6, 2004
INVENTOR(S) : Yao et al.

It is certified that error appears in the above-identified patent and that said Letters Patent is hereby corrected as shown below:

Column 4,
Line 67, please delete "4,4'-".

Column 5,
Line 1, please delete "diaminophenylether-".

Signed and Sealed this

Eighteenth Day of May, 2004

JON W. DUDAS
*Acting Director of the United States Patent and Trademark Office*